INVENTORS
PETER A. BUCKY
ALBERT W. GLEASON
BY
Amster & Rothstein
ATTORNEYS

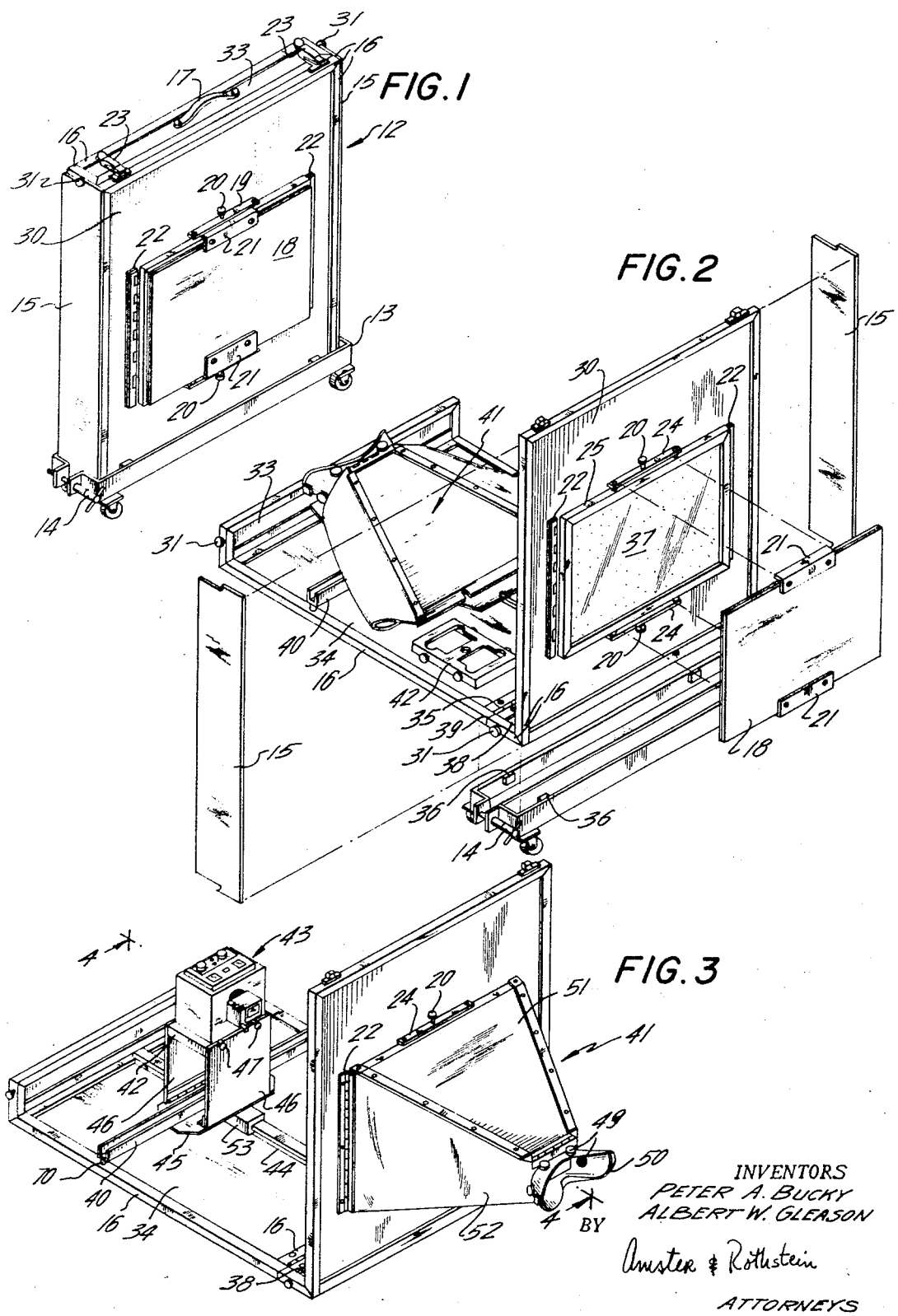

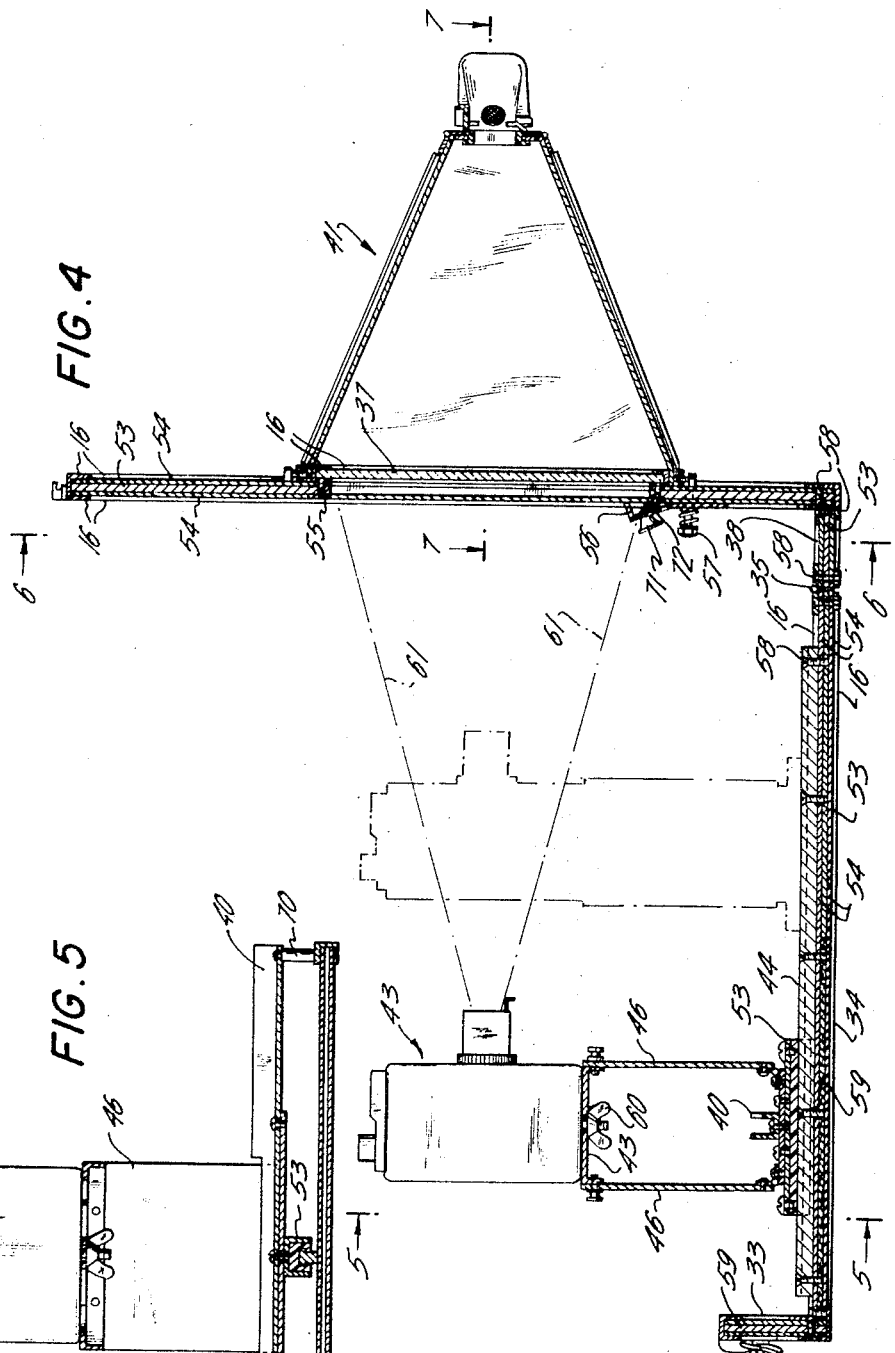

June 3, 1969  P. A. BUCKY ET AL  3,448,266
PORTABLE X-RAY ADJUSTABLY MOUNTED IN A CARRYING
CASE LINED WITH LEAD
Filed Dec. 15, 1966  Sheet 4 of 4

INVENTORS
PETER A. BUCKY
ALBERT W. GLEASON
BY
Austen & Rothstein
ATTORNEYS

United States Patent Office 3,448,266
Patented June 3, 1969

3,448,266
PORTABLE X-RAY ADJUSTABLY MOUNTED IN A CARRYING CASE LINED WITH LEAD
Peter A. Bucky, New York, and Albert W. Gleason, Albertson, N.Y., assignors to Bucky X-ray International, Inc., New York, N.Y., a corporation of New York
Filed Dec. 15, 1966, Ser. No. 602,053
Int. Cl. G01n 23/00, 23/04; G21f 5/00
U.S. Cl. 250—71    7 Claims

ABSTRACT OF THE DISCLOSURE

A portable X-ray detector in which the carrying case is an integral part of the detector. The inside of the case includes a mounting assembly for holding an X-ray generator. The X-ray detector, e.g., a fluorescent screen, is attached to a wall of the case. The case itself is lined with lead so that when the case is opened and the apparatus is set up, the case itself blocks secondary radiation.

---

This invention relates to X-ray detectors, and more particularly to lightweight, portable equipment suitable for fluoroscopic and radiographic work which may be transported conveniently from location to location and which provide adequate protection to the operator from primary and secondary radiation.

Within a very short time period after the discovery of X-rays, at the end of the last century, it was recognized that they were a powerful investigative and medical diagnostic tool. Today, the applications of X-ray technology are legion. The use of X-rays ranges from the analysis of the physical characteristics of crystals to the detection of cavities in human teeth. But while X-rays serve man beneficially in numerous situations they can also be deadly if not properly controlled. Because of their destructive action on cells, X-rays are used in the treatment of certain forms of cancer and other pathological conditions. Without adequate shielding, however, healthy cells and even life itself may be destroyed.

Anyone who has paid a visit to a dentist's or doctor's office is aware of the precautions taken with the use of X-ray machines. Usually, the machine is placed in a separate room whose walls are lead-lined. The user of the equipment also often wears a lead-lined apron. Lead shielding is used because lead is one of the most adequate materials for blocking X-ray transmission therethrough.

In recent years a considerable need has developed for portable X-ray equipment. For example, the major police departments in this country have bomb disposal squads which frequently resort to X-ray equipment for finding suspected bombs hidden in public places. A portable X-ray machine, that is, a machine which generate X-rays, of very light weight has already been developed. The machine is sold under the mark Bucky Miniature and weighs less than twenty pounds. Unfortunately, up to the present time no safe portable detecting equipment has been available. While portable fluorescent or photographic equipment has been used with the generating equipment, these detectors are generally very dangerous to use because of their inadequate shielding. For this reason there has been a considerable risk to the X-ray technician who has had to resort to the use of portable X-ray machines.

It is a general object of this invention to provide lightweight, portable X-ray detecting equipment with sufficient shielding to eliminate the hazards associated with the use of portable X-ray equipment.

In accordance with the principles of my invention, the case which is used to transport the detecting equipment is a substantial part thereof. In a first illustrative embodiment of my invention the case is constructed of lead-lined front and rear walls. The case itself may be carried by hand or transported on a dolly. When the dolly is removed and the case opened, the rear wall is placed on horizontal surface and the front wall opens up to a vertical position. To the front wall is attached a fluorescent screen and a bracket for mounting photographic plates. The rear (horizontal) wall has attached to it equipment for mounting a portable X-ray generating machine. Included in the case are various attachments such as a hood which is secured to the fluorescent screen for viewing purposes.

The mounting bracket for the X-ray generating equipment is movable on the rear wall in order to decrease the air absorption of X-rays when small objects are being examined. However, the movement of this bracket is constrained within predetermined bounds to limit the primary radiation field to the size of the fluorescent screen. The walls of the case are lined with lead in those areas necessary to "catch" or block excessive secondary radiation which may be produced for any position of the generating equipment on the movable bracket. In this manner there is no possibility for a technician to set up the generating and detecting equipment such that harmful radiation will be transmitted to the operator or observers of the operation. Moreover, it is possible to reduce the weight of the detecting equipment by incorporating lead lining only in those areas which must be lead-lined to prevent secondary radiation from reaching the user. The other areas of the case may be constructed of lightweight structural materials so as to reduce the overall weight of the equipment.

In a second illustrative embodiment of my invention only the rear and bottom walls of the case are lead-lined. The front wall is constructed of lightweight structural material and is not used for detecting purposes other than to serve as a platform for small objects to be observed if desired. The rear wall forms the bottom surface of the detecting equipment when in use. Included in the case is a lead-lined board which is attached in an upright position to the case. This attachable board has mounted thereon the fluorescent screen and photographic plate mounting. In this embodiment of the invention the mounting bracket for the generating equipment is fixed to the lower wall of the case (the rear wall when in use). This arrangement enables a very lightweight construction to be achieved, at the expense of flexibility of use. In this embodiment, too, the walls of the case and the vertical front board are lined with lead only in those areas necessary to block all harmful radiation. As with the first embodiment of the invention there is no opportunity for a user of the equipment to accidentally arrange the equipment in a manner which permits harmful radiation to escape and fall on interested observers.

It is a feature of this invention to provide a portable case for X-ray detecting equipment which when opened forms a part of the detecting apparatus.

It is a further feature of this invention to provide mounting equipment for the X-ray generating apparatus to constrain its movement with respect to the detecting equipment.

It is a still further feature of this invention to provide lead lining in the shielded areas of the detecting equipment which is effective to block all harmful radiation from the generating equipment for all possible positions of the generating equipment within the pre-imposed constraints.

Further objects, features and advantages of my invention will become apparent upon consideration of the following detailed description in conjunction with the drawing wherein:

FIG. 1 depicts a first illustrative embodiment of the invention in its folded-up or carrying condition;

FIG. 2 depicts the case of FIG. 1 in its open position with various parts thereof removed preparatory to use of the detecting equipment;

FIG. 3 depicts the detecting equipment set up for use, together with an attached X-ray generator;

FIG. 4 is a sectional view of the equipment taken along the line 4—4 of FIG. 3;

FIG. 5 is a sectional view of the equipment taken along the line 5—5 of FIG. 4;

Figure 6:
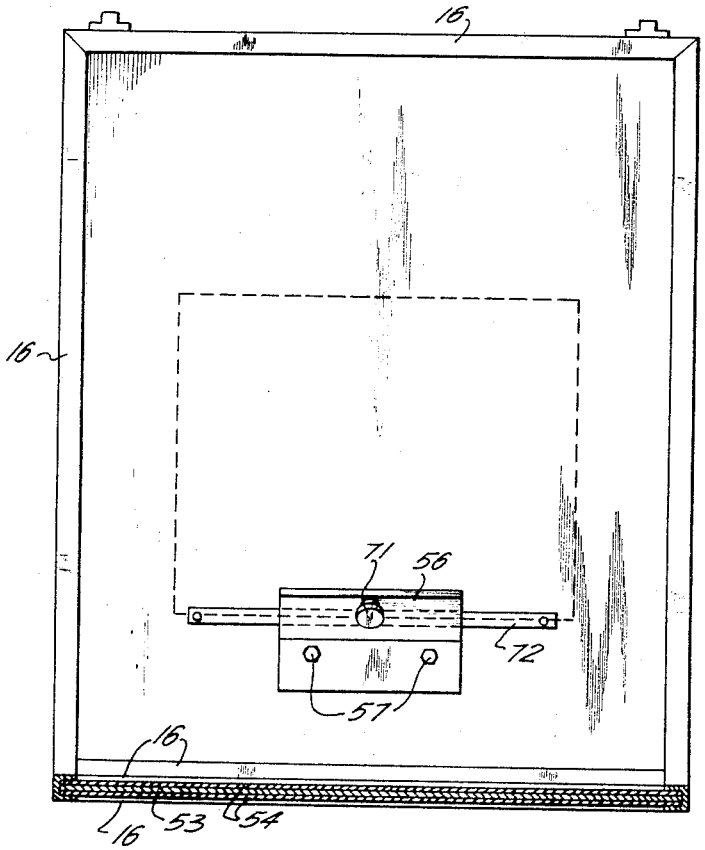
FIG. 6 is a sectional view of the equipment taken along the line 6—6 of FIG. 4.
Figure 7:
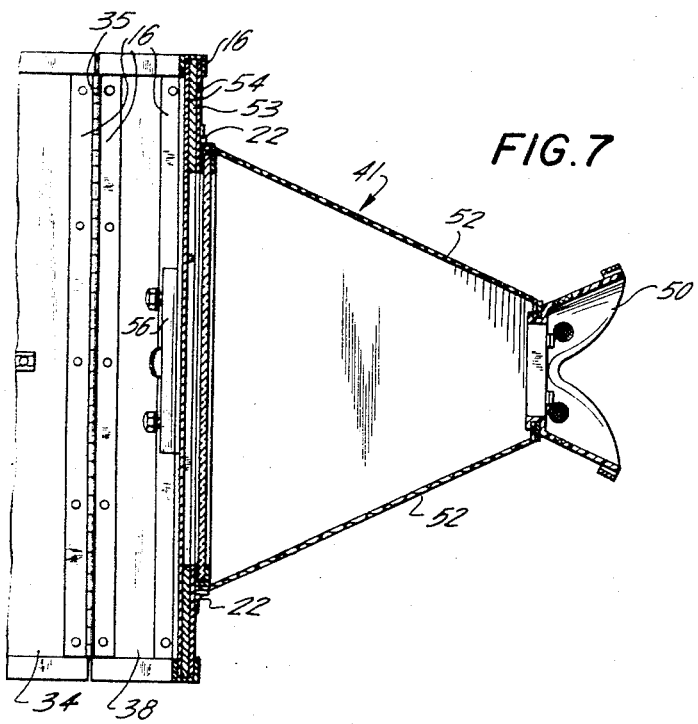
FIG. 7 is a sectional view of the equipment taken along the line 7—7 of FIG. 4.

Referring to FIG. 1, case 12 is carried by dolly 13 for ease of movement. The case may be gripped by handle 17 attached thereto. The dolly includes two tightening screws 14 (only one of which is seen in the perspective view of FIG. 1) for securing the case to the dolly while the detecting equipment is being transported from one location to another. The rear face or wall of the case (which is also not seen in the drawing) is flat. Front wall 30 includes two hinges 22 and a cover plate 18. This cover protects the fluorescent screen when the detecting equipment is not in use.

The case is shown in FIG. 2 in its open position preparatory to use. The first step in opening the case is to release it from the dolly. This is accomplished by unscrewing the two tightening screws 14. Metal molding 16 surrounds the edges of the various walls of the case 12. The dolly includes four lugs 36 which fit over the molding 16 along the lower edge of the front and rear walls of the case. These lugs secure the case to the dolly when screws 14 are tightened. With the loosening of the screws the case may be lifted from the dolly.

The next step is to remove the two side plates 15. A screw 31 is provided at each end of the upper and lower walls 33 and 38. When the case is in the closed position each of side plates 15 may be inserted between the two respective screws and secured to the case. To open the case the four screws 31 are loosened and the side plates removed.

When the case is opened lower wall 38 and rear wall 34 together form the bottom surface of the detecting equipment. Front wall 30 forms the vertical or upright wall of the unit. The case is opened by releasing clasps 23 along the upper wall. Only one hinge 35 is necessary in the unit to enable it to open as desired. This hinge connects the lower end of rear wall 34 to the rear edge of lower wall 38. The molding 16 along the sides of the rear wall and along the sides of the lower wall abut against each other as shown at 39 when the case is open. This construction enables the unit to stand rigidly without wobbling while in use.

Fluorsecent screen 37 is attached to front wall 30. Materials for such screens are well known in the art and lead glass for the fluorescent screen may be readily purchased. The fluorescent screen is permanently attached to front wall 30 and only cover 18 may be removed. Cover 18 includes two lugs 21 which are insertable in respective brackets 24 on wall 30. Each bracket includes tightening screw 20 for securing protective cover 18 to the fluorescent screen when the unit is not in use.

Attached to rear wall 34, and only partially visible in FIG. 2, is a mounting assembly to be described below with reference to FIG. 3. Also included within the case is a hood 41 and a supporting plate 42. These two elements are not attached to the case and may be carried externally to it; however, for the utmost convenience they may be left in the case when not in use.

The detecting equipment is shown fully assembled in FIG. 3. Hood 41 is constructed of upper and lower rigid sections of material 51, and two flexible sections 52 made of leather. The upper and lower sections 51 include lugs which are inserted into brackets 20 on the front wall. Screws 20 secure the hood to the front wall in the same manner that they secure protective cover 18 to the front wall when the unit is not in use. The two side hinges 22 are effective to secure the rear edges of flexible side sections 52 of the hood to the frame 25 of the fluorescent screen. In this manner the hood may be attached to the frame to prevent any external light from interfering with the view on the fluorescent screen. The hinges effect an adequate light shield. The hood includes a viewing section 50 at the front threeof. This viewer fits around the face of the operator and directs his view toward the fluorescent screen. The hood also includes a series of ventilating buttons 49 for the comfort of the operator.

Attached to the inner face of rear wall 34 is a rigid bar 44. Sliding element 53 is disposed for movement along this bar in the axial direction of the detecting unit. Attached to the sliding mechanism 53 is a mounting plate 45 having two hinged side plates 46. When the unit is not in use the side plates are folded over away from each other and rest against bar 44. In assembling the detecting equipment for use, the two plates 46 are placed in vertical positions and mounting plate 42 is attached as shown at the upper ends thereof. Four screws 47 are provided for this purpose, A lightweight X-ray generating machine 43 then may be attached to mounting plate 42. As described above, the Bucky Miniature portable X-ray unit is ideally suited for the purpose. A rigid beam 40 is welded to mounting plate 45 as shown in the drawing. At each end of the beam there is a sliding lug 70 having a relatively low coefficient of friction. Beam 40 is included in the unit primarily to balance the X-ray generating equipment. Lugs 70 permit slider 53 and X-ray unit 43 to be moved in the axial direction along bar 44 with a minimum of effort.

The X-ray machine cannot be moved, in the illustrative embodiment of the invention, in a direction along beam 40. It can be moved along bar 44, however, within the bounds determined by the size of slider 53. The maximum forward and rearward movements are determined by the engagements of the slider with molding 16 at the ends of the rear wall of the case. An object to be X-rayed is placed between X-ray unit 43 and fluorescent screen 37. The necessary adjustments are made on the X-ray unit and it is positioned along bar 44 for the best possible view on the fluorescent screen.

A sectional view of the assembled detecting equipment is shown in FIG. 4. Phantom lines 61 depict bounds of the primary radiation. It will be noted from FIG. 4 that the X-ray unit is secured to plate 43 by winged nut 60. The position of bracket 56 to the rear of the fluorescent screen should also be noted. This bracket is forced against the rear face of the screen by spring assembly 57. If it is desired to photograph the X-ray image, the bracket is pulled back and a photographic plate is inserted against the rear of the screen. The bracket maintains the photographic plate aligned with the screen. A knob 71 is provided to pull back bracket 56 when a photographic plate is either inserted or removed. As seen most clearly in FIG. 6, a bar 72 is attached to the rear of the front wall at the bottom end of the fluorescent screen to support a photographic plate. The fluorescent screen 37 itself is secured to front wall 30 by a series of screws 55 around its periphery.

As described above, a major difficulty with portable X-ray equipment has been the lack of adequate shielding. The shielding provided in the illustrative embodiment of the invention eliminates all hazards typically associated with prior art portable X-ray equipment. This shielding is shown most clearly in FIGS. 4–7. Throughout these figures various lead plates are shown by the numeral 53 and various laminated plastic sheet coatings are shown by the numeral 54. A variety of screws 58 are shown throughout the drawing for securing plastic sheets 54 to both sides of each lead plate 53. The plastic sheets are included primarily for aesthetic purposes.

The front wall contains a rectangular sheet of lead at the interior thereof with front and back laminated sheets of plastic. The lead, however, includes a rectangular cut-out adjacent the fluorescent screen 37. In addition, the front plastic sheet 54 is provided with a similarly proportioned cut-out so as not to obstruct the view of the screen. It is not necessary to provide a similar cut-out for the rear plastic cover because the plastic material is easily penetrated by the X-rays.

Lower wall 38 consists of a rectangular sheet of lead material along the entire area thereof, together with two sheets of plastic covering material.

Rear wall 34 is similarly provided with a sheet of lead shielding. However, the lead shielding does not extend all along the wall. It extends only from the end of the wall abutting wall 38 until approximately the center line of the wall. Toward the rear of the wall (the upper part of the wall in the closed position), lighter weight structural material 59, such as wood, is used in place of the lead shielding. Similar remarks apply to wall 33. As shown most clearly in FIG. 4, the maximum zone of primary radiation is approximated by phantom lines 61. The hazards to human health arise from the secondary radiation outside the bounds defined by this zone as well as the primary radiation. The lead shielding is provided along the lower surface of the unit only to the extent necessary to shield against the secondary radiation directed toward the bottom of the unit. Since there is almost no secondary radiation to the rear of the center line where lead sheet 53 abuts structural material 59, the overall weight of the complete unit may be minimized by utilizing lightweight structural materials at those regions where there is no requirement to provide shielding.

In the illustrative embodiment of FIGS. 1–7, the movement of X-ray unit 43 is constrained within predetermined bounds as described above. It is this feature which provides maximum safety even with the use of relatively small shielding plates. Because the position of the X-ray generating unit must be maintained within predetermined bounds, the case may be designed with just the proper amount of lead shielding necessary to protect against secondary radiation for any possible position of the generating unit. It is not necessary to limit the use of the X-ray equipment to a particular well shielded room or to require the wearing of lead-lined aprons by the technicians operating the equipment. This feature, together with the use of the case itself as part of the shield, enables a completely safe but lightweight portable detecting apparatus to be constructed. Of course, other designs are contemplated. For example, in some applications it may not be necessary to provide lead shielding in the rear wall (the lower wall of the unit when in use). However, for maximum safety this shielding should be provided. For example, if the detecting equipment is placed on a desk and the operator sits at the desk with the lower part of his body directly below the lower wall, without adequate shielding he may be seriously hurt.

Figure 9:
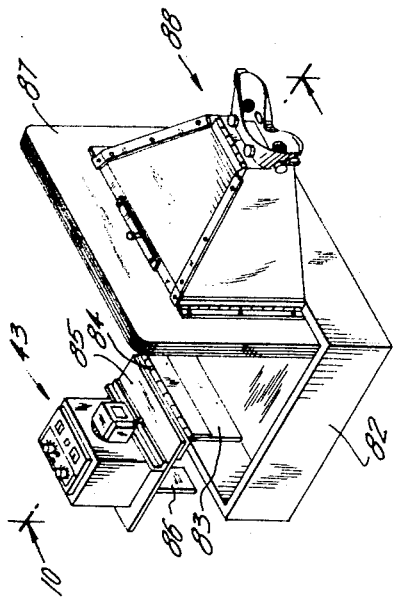
FIG. 9 depicts the detecting equipment of FIG. 8 in its assembled, operative condition.
Figure 10:
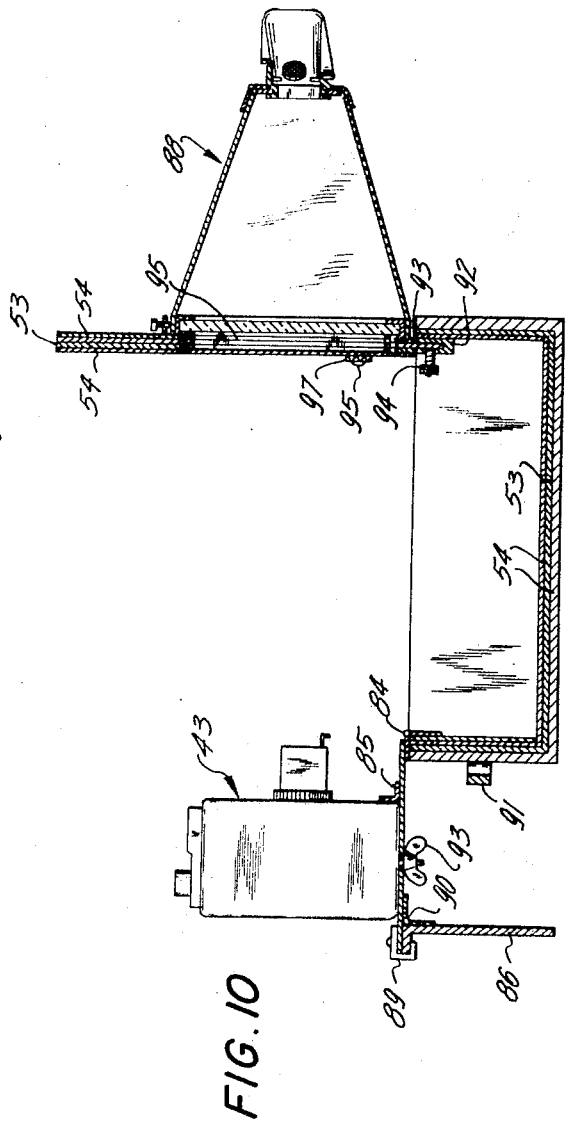
FIG. 10 is a sectional view of the equipment taken along line 10—10 of FIG. 9.
Figure 8:
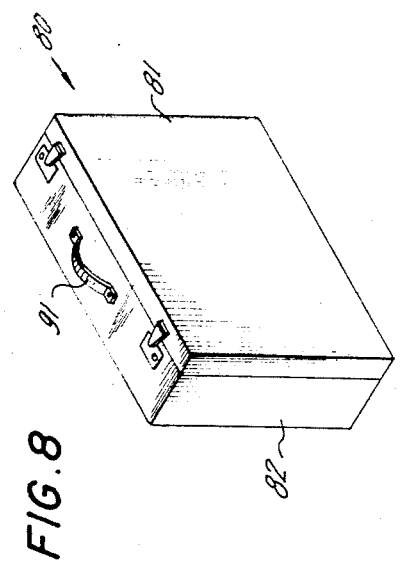
FIG. 8 depicts a second illustrative embodiment of the invention in its closed or carrying condition.

A second illustrative embodiment of my invention is shown in FIGS. 8–10. This embodiment is even more lightweight than the first, and for this reason no dolly is provided for carrying the case. The case 80 consists of a base section 82 with a handle 91 thereon, and a detachable cover 81. The cover is not used in operating the unit.

The assembled detecting unit is shown in FIGS. 9 and 10. Attached to the interior of base 82 is a bracket 83. This bracket is connected by hinge 84 to mounting plate 85. Swivel bracket 89 when in the closed position maintains leg 86 secured to an upright position with respect to mounting plate 85.

To pack up the equipment swivel bracket 89 is opened and leg 86 is folded against plate 85 about hinge 90. The leg and the plate are then folded about hinge 84 into the case. Removable hood 88 may also be carried in the case.

It will be noted from FIGS. 9 and 10 that X-ray generating unit 43 when attached to mounting plate 85 by winged nut 93 is not movable with respect to the fluorescent screen. The reduced weight is achieved at the expense of flexibility.

Carried within the case is a front plate 87 to which is attached fluorescent screen 95. The lower edge of the front plate has an extended steel lug 93 across its width. This lug fits into bracket 92 which is secured to base section 82 as shown in FIG. 10. With the front plate in place three screws 94 are tightened to secure steel lug 93 to bracket 92. Hood 88 is secured to plate 87 in the same manner that the hood is secured to the front wall in the first illustrative embodiment of the invention. Plate 87 is not provided at the rear thereof with a bracket for attachment to a photographic plate. Instead a removable elastic band 97 is secured along the width of the plate by two screws 95, and this elastic band holds a photographic plate against the fluorescent screen if it is desired to photograph the X-ray pattern.

The lead shielding in the second illustrative embodiment of the invention is similar to that in the first embodiment. Base section 82 of the case is provided with lead sheets 53 and with plastic facing covers 54. As shown, lead shielding is provided along the entire base section 82. However, depending upon the dimensions of the case and the expected radiation pattern, it may be possible to eliminate some of the lead shielding and to substitute a lighter weight structural material therefor.

Front plate 87 is similarly provided with a lead sheet 53. A rectangular cut-out is made in this sheet adjacent the fluorescent screen 95. Plastic sheet 54 at the front of plate 87 is similarly provided with a cut-out in order not to block the image on the fluorescent screen. A similarly configured cut-out is not necessary on the rear plastic cover of plate 87 because the X-rays easily penetrate the plastic material.

As in the first illustrative embodiment of the invention the primary advantage of the portable X-ray detector of FIGS. 8–10 is that completely adequate shielding may be obtained with a minimum of weight. Here, too, the case itself serves as part of the shielding, and because the position of the X-ray generator 43 is fixed with respect to the detector, a minimum amount of shielding may be provided without creating undue hazard.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What is claimed is:

1. A portable X-ray detector comprising a carrying case, means for detecting an X-ray pattern, a mounting assembly attached to the interior of said carrying case for attachment to an X-ray generator, means for controlling the positioning of said X-ray generator mounting assembly with respect to said detecting means on said carrying case such that when said carrying case is open and an object to be X-rayed is placed between said X-ray generator and said detecting means an X-ray pattern is depicted on said detecting means, and lead shielding within said carrying case and disposed around said detecting means having an area sufficient to block harmful radiation from said X-ray generator when said carrying case is open and said generator is mounted to said mounting assembly.

2. A portable X-ray detector comprising a case having a front wall, a rear wall, a lower wall and an upper wall, said lower wall being rigidly secured at a right angle to said front wall, a hinge rotatably connecting said rear wall to said lower wall, said upper wall being rigidly secured at a right angle to said rear wall, clasping means for securing said front wall to said upper wall, means for detecting an X-ray pattern attached to the front face of said front wall, a movable slide assembly secured to the inner face of said rear wall, X-ray generator mounting means secured to said slide assembly and movable along said rear wall in the axial direction thereof, a first lead shield within said front wall having a cut-out therein conforming to the configuration of said detecting means, a second lead shield within said lower wall, and a third lead shield within the lowermost region of said rear wall, said first, second and third lead shields having areas sufficient to block all harmful radiation from an X-ray generator attached to said mounting means for all positions of said mounting means when said case is open within the limits of movement imposed by said slide assembly.

3. A portable X-ray detector in accordance with claim 2 wherein said detecting means is a fluorescent screen, and further including a viewing hood and means for selectively attaching said viewing hood to said front face of said front wall around said fluorescent screen.

4. A portable X-ray detector in accordance with claim 2 wherein said mounting means is selectively foldable within said case.

5. A portable X-ray detector comprising a case having a base section and a releasable cover section, a foldable mounting assembly attached to the interior of said base section for attachment to an X-ray generator, a mounting bracket secured to said base section disposed opposite to said mountnig assembly, a plate having X-ray detecting means thereon, said plate including means selectively attachable to said mounting bracket, a first lead shield within said plate, and a second lead shield within said base section, said first and second lead shields having areas sufficient to bloc kharmful radiation from said X-ray generator.

6. A portable X-ray detector in accordance with claim 5 wherein said detecting means is a fluorescent screen, and further including a viewing hood and means for selectively attaching said viewing hood to the front face of said plate around said fluorescent screen.

7. A portable X-ray detector in accordance with claim 5 wherein said mounting assembly includes an X-ray generator mounting plate hinged to said base section and a supporting leg hinged to said mounting plate.

References Cited
UNITED STATES PATENTS

| | | | |
|---|---|---|---|
| 2,327,294 | 8/1943 | Wheeler | 250—65 |
| 2,894,140 | 7/1959 | Schneeman | 250—52 |
| 3,293,430 | 12/1966 | Wustner | 250—108 X |

ARCHIE R. BORCHELT, *Primary Examiner.*

A. L. BIRCH, *Assistant Examiner.*

U.S. Cl. X.R.

250—65, 108